(12) United States Patent
Egan (10) Patent No.: US 8,830,039 B1
(45) Date of Patent: Sep. 9, 2014

(54) METHOD AND APPARATUS FOR PROVIDING COMMUNICATIONS BETWEEN AN ELECTRIC VEHICLE AND A CHARGING STATION

(75) Inventor: John Egan, Palm Harbor, FL (US)

(73) Assignee: Marvell International Ltd., Hamilton (BM)

( * ) Notice: Subject to any disclaimer, the term of this patent is extended or adjusted under 35 U.S.C. 154(b) by 74 days.

(21) Appl. No.: 13/446,816

(22) Filed: Apr. 13, 2012

Related U.S. Application Data (60) Provisional application No. 61/477,073, filed on Apr. 19, 2011.

(51) Int. Cl.
*G05B 11/01* (2006.01)

(52) U.S. Cl.
USPC ......................... 340/12.32; 320/109

(58) Field of Classification Search
USPC ............... 340/12.32, 568, 538; 320/109, 137; 180/65.21, 65.1; 375/257, 260, 219
See application file for complete search history.

(56) References Cited

U.S. PATENT DOCUMENTS

| | | | | |
|---|---|---|---|---|
| 7,269,403 | B1 * | 9/2007 | Miao ............................. | 455/402 |
| 2004/0177167 | A1 * | 9/2004 | Iwamura et al. ............... | 709/253 |
| 2008/0040223 | A1 * | 2/2008 | Bridges et al. ................. | 705/14 |
| 2011/0074351 | A1 * | 3/2011 | Bianco et al. ................. | 320/109 |
| 2011/0080937 | A1 * | 4/2011 | Kim et al. ..................... | 375/219 |
| 2011/0133684 | A1 * | 6/2011 | Eikeland et al. .............. | 320/101 |
| 2011/0202293 | A1 * | 8/2011 | Kobraei et al. ................ | 702/62 |

FOREIGN PATENT DOCUMENTS

WO    WO 2011001430 A2 *   1/2011   ............... H04B 3/54

OTHER PUBLICATIONS

HomePlug Powerline Alliance, "HomePlug Green PHY Specification", http://www.homeplug.org/tech/homeplug_gp, downloaded Apr. 12, 2012, 1 page.
HomePlug, Wikipedia, the free encyclopedia, http://en.wikipedia.org/wiki/HomePlug, downloaded Apr. 12, 2012, pp. 1-6.
IEEE 1901, Wikipedia, the free encyclopedia, http://en.wikipedia.org/wiki/IEEE_1901, downloaded Apr. 12, 2012, pp. 1-5.
G.hn, Wikipedia, the free encyclopedia, http://en.wikipedia.org/wiki/G.hn, downloaded Mar. 28, 2012, pp. 1-12.
International Telecommunication Union, "Applications of ITU-T G.9960, ITU-T G.9961 transceivers for Smart Grid applications: Advanced metering infrastructure, energy management in the home and electric vehicles", ITU-T Technical Paper, Jun. 2010, 32 pages.

(Continued)

*Primary Examiner* — Hai Phan
*Assistant Examiner* — Zhen Y Wu (57) ABSTRACT

The present disclosure includes systems and techniques relating to communications between an electric vehicle and a charging station. In some implementations, a system includes a charging station, a dual signaling path to connect the charging station with an electric vehicle to charge the electric vehicle from the charging station, and processing electronics configured to communicate information to the electric vehicle using the dual signaling path, wherein the dual signaling path comprises a first path to support charging of the electric vehicle and a second path to support receiving control data from the electric vehicle, and wherein the processing electronics are configured to selectively use the first path or the second path in communicating the information to the electric vehicle.

20 Claims, 6 Drawing Sheets

(56) References Cited

OTHER PUBLICATIONS

HomePlug Powerline Alliance, "HomePlug AV White Paper", 2005, 11 pages.

Blasco Claret, "Communication Node and Procedure for Various Means of Transmission", U.S. Appl. No. 11/208,535, Mar. 23, 2011, 26 pages.

* cited by examiner

METHOD AND APPARATUS FOR PROVIDING COMMUNICATIONS BETWEEN AN ELECTRIC VEHICLE AND A CHARGING STATION

CROSS REFERENCE TO RELATED APPLICATIONS

This disclosure claims the benefit of the priority of U.S. Provisional Application Ser. No. 61/477,073, filed Apr. 19, 2011 and entitled "DUAL SIGNALLING PATH FOR POWERLINE COMMUNICATIONS FOR ELECTRIC VEHICLES ATTACHED TO CHARGING STATIONS", which is hereby incorporated by reference in its entirety.

BACKGROUND

The present disclosure describes systems and techniques relating to communications between an electric vehicle and a charging station.

A pluggable Electric Vehicle (EV) should be able to communicate charging control and billing information with an Electric Vehicle Supply Equipment (EVSE) device. EVSE typically includes an EV charger, separate electricity usage meter, and associated electronics to manage the charging sessions. The typical EVSE cable that links the EV with the EVSE is known as a J-1772 cable. This cable has various wires in it, and among these wires are a control/sense wire (or wires) used by the EV and EVSE for detection of when the cable is connected to an EV, plus those wires used for charging the EV located batteries.

Over the J-1772 cable will be passed command and control data related to the identification and billing information of the vehicle, possibly maintenance data to be passed to a servicing company (if there is an Internet link to the EVSE), battery charge state, battery health, and other similar data. The microcontroller in the EV signals the EVSE microcontroller to begin the charging. The EVSE, through its links to the utility, its rate/billing database, and its relative ampere flow capacity, will establish a rate of charge, possibly delayed due to utility command, and may fluctuate the charge based on remote commands, billing rate for the electricity used, and user input (e.g., a request for rapid charge).

Once the microcontroller of the EV determines its batteries are fully charged, it notifies the EVSE, and charging is halted. The sense/control leads act as triggers to apply power to the J-1772 cable, thus ensuring a safety margin, and the absence of a sense signal over these leads causes the EVSE to immediately remove power from the J-1772 cable, again as a means of safety. The charge wires are used for this function and are relatively larger in wire gauge versus the sense leads.

SUMMARY

The present disclosure includes systems and techniques relating to communications between an electric vehicle and a charging station. According to an aspect of the described systems and techniques, a system includes a charging station; a dual signaling path to connect the charging station with an electric vehicle, wherein the electric vehicle is chargeable from the charging station using the dual signaling path; and processing electronics configured to communicate information to the electric vehicle using the dual signaling path, wherein the dual signaling path includes a first path to support charging of the electric vehicle and a second path to support receiving control data from the electric vehicle, and wherein the processing electronics are configured to selectively use the first path or the second path in communicating the information to the electric vehicle.

The processing electronics can be configured to selectively use solely the first path, solely the second path, or both the first and second paths in communicating the information to the electric vehicle. The dual signaling path can include a J-1772 cable. Moreover, in some cases, only one of the first path and second path is used to communicate the information at any one time.

The processing electronics can include a multiple input multiple output (MIMO) wideband powerline communications (PLC) transceiver. The MIMO wideband PLC transceiver can include a G.hn transceiver or a Green PHY (GP) transceiver. In addition, the processing electronics can be configured to use wideband PLC over the first path and robust mode wideband PLC over the second path.

According to another aspect of the described systems and techniques, an apparatus includes a first analog front end part connected with a power lead of an electric vehicle charging system; a second analog front end part connected with a control lead of the electric vehicle charging system; and a powerline communications (PLC) multiple input multiple output (MIMO) transceiver coupled with each of the first analog front end part and the second analog front end part, wherein the PLC MIMO transceiver is configured to transmit and receive using the power lead or the control lead. The PLC MIMO transceiver can be configured to transmit and receive using only the power lead, only the control lead, or both the power lead and the control lead. A J-1772 cable can be used, where the J-1772 cable includes the power lead and the control lead.

The PLC MIMO transceiver can include a GP transceiver and/or a Low Complexity Profile (LCP) transceiver, such as a G.hn transceiver. The PLC MIMO transceiver can be configured to use only one of the power lead and the control lead to communicate information at any one time. Moreover, the PLC MIMO transceiver can be configured to use wideband PLC over the power lead and robust mode wideband PLC over the control lead.

According to another aspect of the described systems and techniques, a method includes receiving a signal on a control lead of an electric vehicle charging system, the signal indicating an electric vehicle is attached; communicating initial data over the control lead; determining whether a power lead of the electric vehicle charging system is available for data exchange; using wideband PLC in robust mode over the control lead to communicate additional data when the power lead is not available for data exchange; and using wideband PLC over the power lead to communicate additional data when the power lead is available for data exchange. In addition, the method can include determining whether both the power lead and the control lead can be used together for data exchange; and if so using wideband PLC over both the power lead and the control lead to communicate additional data.

The power lead and the control lead can be parts of a J-1772 cable. Using the wideband PLC can include using the wideband PLC in accordance with GP or LCP (e.g., G.hn). Moreover, using the wideband PLC can include using only one of the power and control leads to communicate data at any one time.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform method operations. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

The described systems and techniques can provide a dual path communication architecture based on MIMO (Multiple In Multiple Out) technology and wideband powerline communications (PLC), such as HomePlug AV, HomePlug AV2, IEEE (Institute of Electrical and Electronics Engineers) 1901, and G.hn. MIMO is being added to G.hn, which is associated with communications over various types of wires in a home network, but MIMO is being defined here for use over the same wires within a single cable (e.g., a single power cable in the home that provides a single circuit, which typically has a hot lead, a neutral lead, and a ground lead). The hot and ground are used for one of the MIMO paths, and the neutral and ground are used for the other MIMO path. The two paths are used to simultaneously transmit or receive from one device to another in the network. The use of multiple routes in the same cable improves communications, e.g., providing increased noise robustness.

The present EV application is defining a different use of this technology. It is defined as dual paths, however, not over the same cable's wires that make up a single circuit. Instead, while using parts of the J-1772 cable, one path is sent over the sense wire(s) and the other is over the power wire(s). These paths need not be used simultaneously, contrary to the original MIMO concept. Instead, either one path or the other can be made active at any one time. Either path can be used, under control of the microcontrollers at the EV and EVSE. The half-duplex nature of G.hn signaling need not be modified for this application. As the components used can be G.hn Low Complexity Profile (LCP) chips or Green PHY chips (both digital back end and analog front end) that support MIMO, the use is different while the design can be the same as a standard G.hn network application.

The described systems and techniques can result in improved communications between an electric vehicle and a charging station. For example, larger data sets (e.g., multimedia data, such as updates to maps for satellite navigation systems) can be communicated between the electric vehicle and the charging station over the charging cable at a higher data rate. Improved communications can be realized at lower cost and using existing charging cables. This can be accomplished while allowing for flexibility in implementation in the electric vehicle market. For example, a multi-route link between two PLC transceivers/devices related to electric vehicles can be provided, where not all electric vehicles need to include the PLC transceiver/device since the PLC transceiver/device in the charging station can determine what form of signaling to use with a currently attached electric vehicle. Moreover, since both paths are electrically separated, noise on one need not transfer through the dual path equipment being proposed. Further, the issue of how to accurately associate an EV to an EVSE can be resolved through this application.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

Figure 1:
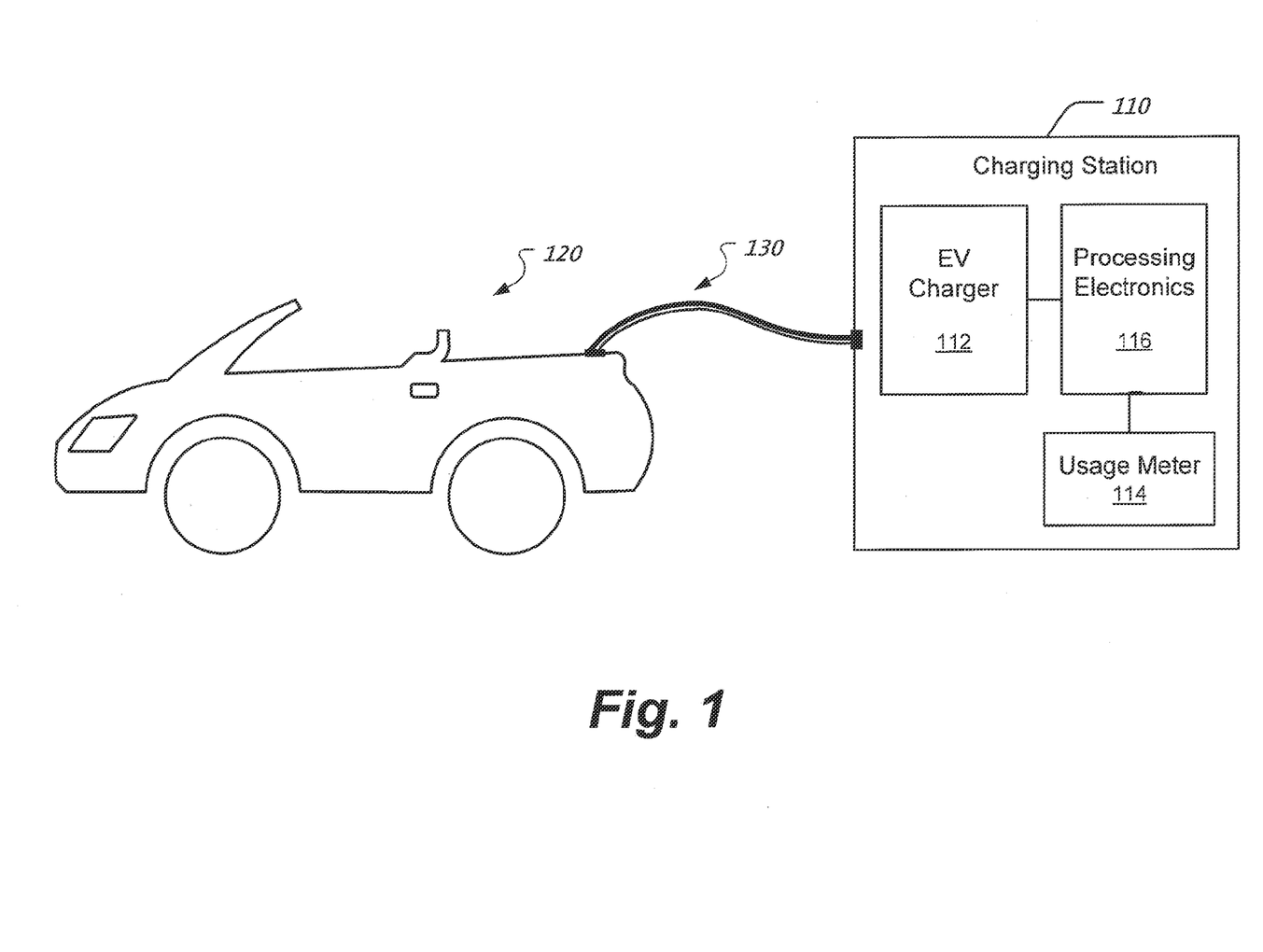
FIG. 1 shows an example of an electric vehicle charging system.

FIG. 1 shows an example of an electric vehicle charging system. The system includes a charging station 110, an electric vehicle 120, which can be connected to the charging station 110, and a pair of associated cables 130, which provide a dual signaling path between the charging station 110 and the connected electric vehicle (EV) 120. The charging station 110 can be an EVSE device (or a larger system or structure) and can include an EV charger 112, a usage meter 114, and processing electronics 116. The usage meter 114 and the processing electronics 116 can each be integrated with the EV charger 112, or separate from and configured to connect with the EV charger 112. The charging station 110 can be designed for in-home installation, for a public fueling facility, or both. Moreover, other components can be included in the charging station 110, as will be appreciated.

The processing electronics 116 can be implemented as one or more devices, such as one or more integrated circuit (IC) devices, and can include various circuitry, one or more memories or storage, and/or one or more programmed processors. These devices can be built into a single microcontroller chip. The processing electronics 116 can manage the charging session of the EV 120. In addition, the processing electronics 116 can include (either integrated with, or separate from the electronics for charging session management) a transceiver that can communicate with a transceiver in the vehicle 120 using the pair of associated cables 130.

The pair of associated cables 130 can be packaged as a single cable, such as a J-1772 cable or other cables approved for EV charging. The pair of associated cables 130 provides a power lead and a control lead, which can be used as a dual signaling path to connect the charging station 110 with the electric vehicle 120, as described in further detail below. Each of the power lead/cable and the control lead/cable is electrically isolated from the other and can be composed of one or more wires. Moreover, each of the power lead/cable and the control lead/cable can be used to support communication between the charging station 110 and the electric vehicle 120.

Top of the line electric vehicles may require substantial data exchanges, such as data for satellite navigation systems, multimedia content, firmware upgrades, and other large data files. In contrast, basic electric vehicles may not require such multimegabit exchanges, but will require the sense and control functionality provided using the control lead. The relatively small (in gauge) sense/control lead(s) do not easily support a very high data rate while the larger charging lead(s) can readily support a higher data rate in some configurations. EVs 120 with modest functionality and price range can be designed to use only the sense/control lead(s) for communications (e.g., PLC over the control data link), whereas some EVs 120 with greater functionality and price range can be designed to use only the charging lead(s) for communications (e.g., PLC over the power link) and some other EVs 120 with greater functionality and price range can be designed to use both the charging lead(s) and the sense/control lead(s) for communications (e.g., PLC over the power link and the control data link together). The processing electronics 116 can be configured to select an appropriate one of these communication options based on the type of EV 120 that is currently connected (and potentially based on the type of charging station 110 in which the processing electronics 116 are installed). Moreover, in some implementations, only the first two of these three options is made available, and communication using both the power link and the control data link together is not an option. In any case, a multi-route link can be provided between two PLC transceivers/devices associated with the charging of electric vehicles.

Figure 2:
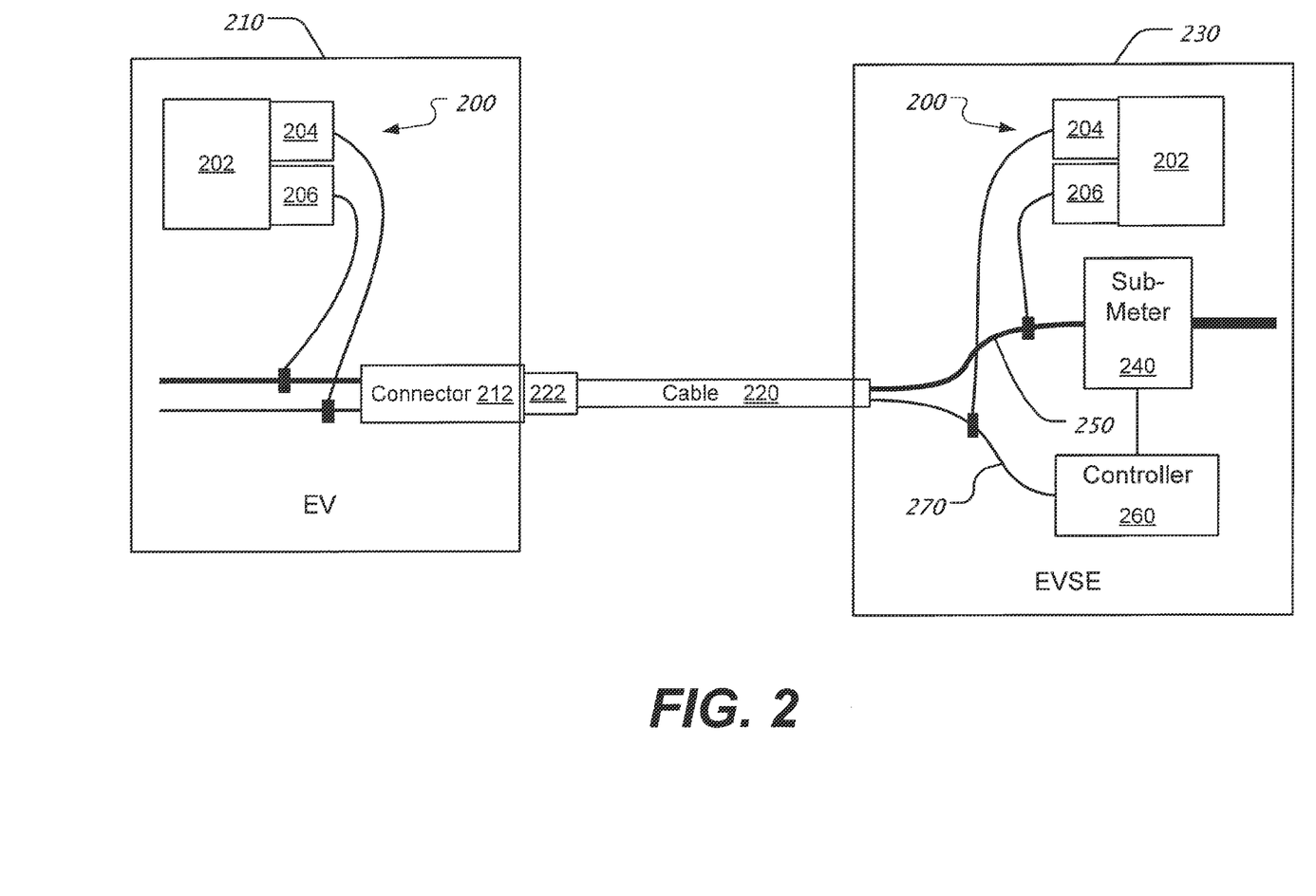
FIG. 2 shows an example of an electric vehicle charging system that uses a J-1772 cable.

FIG. 2 shows an example of an electric vehicle charging system that uses a J-1772 cable 220. The J-1772 cable 220 includes a plug 222 that attaches to a connector 212 to charge EV 210 from EVSE 230. A power feed connects with a sub-meter 240 to provide power over a power lead 250 of the J-1772 cable 220. In addition, a controller 260 connects with a control lead 270 of the J-1772 cable 220 to detect when the cable 220 is connected to an EV 210. Note that single-vehicle EVSE is shown in FIG. 2, but it will be appreciated that the systems and techniques described herein are also applicable to multi-vehicle EVSE.

The control lead 270 is used to sense that the EV 210 is connected and can also be used as a communication path for charge status information (e.g., the current state of charge of a battery in the EV 210) and control information for charging the EV 210. Thus, the control lead 270 is also referred to as the sense & control lead (or wire or cable). The traditional approach to using this communication path has used low bandwidth protocols, which may include narrow band PLC. For higher data rates, such as for multimedia data, the power lead 250 may be used since it may not be possible to achieve the needed throughput using the control lead 270. For example, wideband PLC may be used with the power lead 250 if the infrastructure is appropriate (e.g., when Alternating Current (AC) charging is used over the power lead 250 rather than Direct Current (DC) charging). However, the use of wideband communication protocols, and in particular the use of multiple different communication protocols (e.g., both narrow band PLC and wideband PLC) in EVSE 230 may prove cost prohibitive since keeping costs to a minimum is one of the key factors governing the present development of the smart grid infrastructure for electric vehicles.

Separate from this development, in the context of home networking technology, the G.hn protocol is being enhanced to support MIMO (Multiple In Multiple Out) communication; note that G.hn is an example of wideband PLC. In this context, MIMO PLC sends two data streams, which are components of a full data stream, over three AC wires: phase, neutral, and ground. One of the two data streams is sent over the first and second of these three wires, and the other of the two data streams is sent over the second and third of these wires. As will be appreciated, these two parallel paths are not in fact separate circuits. However, the processing electronics that make up the transceiver for such MIMO communication need not be limited in this respect, and can be designed to handle parallel paths that either are, or are not separate circuits. Thus, a transceiver 200 can be designed and built that operates in the home networking environment and also in the smart grid infrastructure environment, as described further below. This can result in significant cost savings due to the efficiencies of scale that result from producing one transceiver device with a larger market for its use.

Thus, the transceiver 200 can be connected with the control lead 270 for one of the MIMO channels through a first analog front end part 204, and the transceiver 200 can be connected with the power lead 250 for the other MIMO channel through a second analog front end part 206. Note that even though two MIMO channels are used, the transmissions over the two MIMO channels need not be simultaneous. Rather, a modified version of bonding can be used where the two channels appear as the same circuit to the digital back end 202 (e.g., the G.hn chip) in the transceiver 200, but the transceiver 200 can instruct its analog front end which channel to use at any given time. Thus, the transceiver 200 can communicate over the control lead 270, the power lead 250, or both. When using both leads 250 and 270, the transmissions over these two channels can be simultaneous. However, in some implementations, these transmissions are not simultaneous since taking this approach allows the circuitry of the transceiver 200 to be simplified, thus reducing costs further.

Moreover, for some low end cars, the manufacturer may not want to even support use of the power lead. In such cases, the same G.hn chip can be used, but the second analog front end part 206 in the EV 210 can be left out. This can result in reduced costs for the particular EV and also for the system as a whole. Note that the communications interface in the EVSE 230 remains the same. Thus, implementation is simplified across a wide range of vehicles while also providing the flexibility to set the communication capabilities as desired based on the price point for the particular vehicle.

Further, the transmissions sent over the control lead 270 can conform to the wideband PLC protocol, even in the case where the EV 210 does not support transmissions over the power lead 250. A robust mode of transmission can be used to send wideband over the control lead 270, but at a reduced capability (e.g., at 2, 3, 4, or 5 Mb/s throughput, rather than 100 Mb/s) to get through the control lead environment. Thus, a wideband PLC chip in the transceiver 200 of the EVSE 230 can handle multiple different types of EVs 210, providing single channel robust mode PLC transmission over the control lead 270, or providing single channel wideband PLC transmission over the power lead 250, or in some implementations providing wideband MIMO PLC over the leads 250 and 270 together, depending on the capabilities of the currently attached EV 210.

Figure 3:
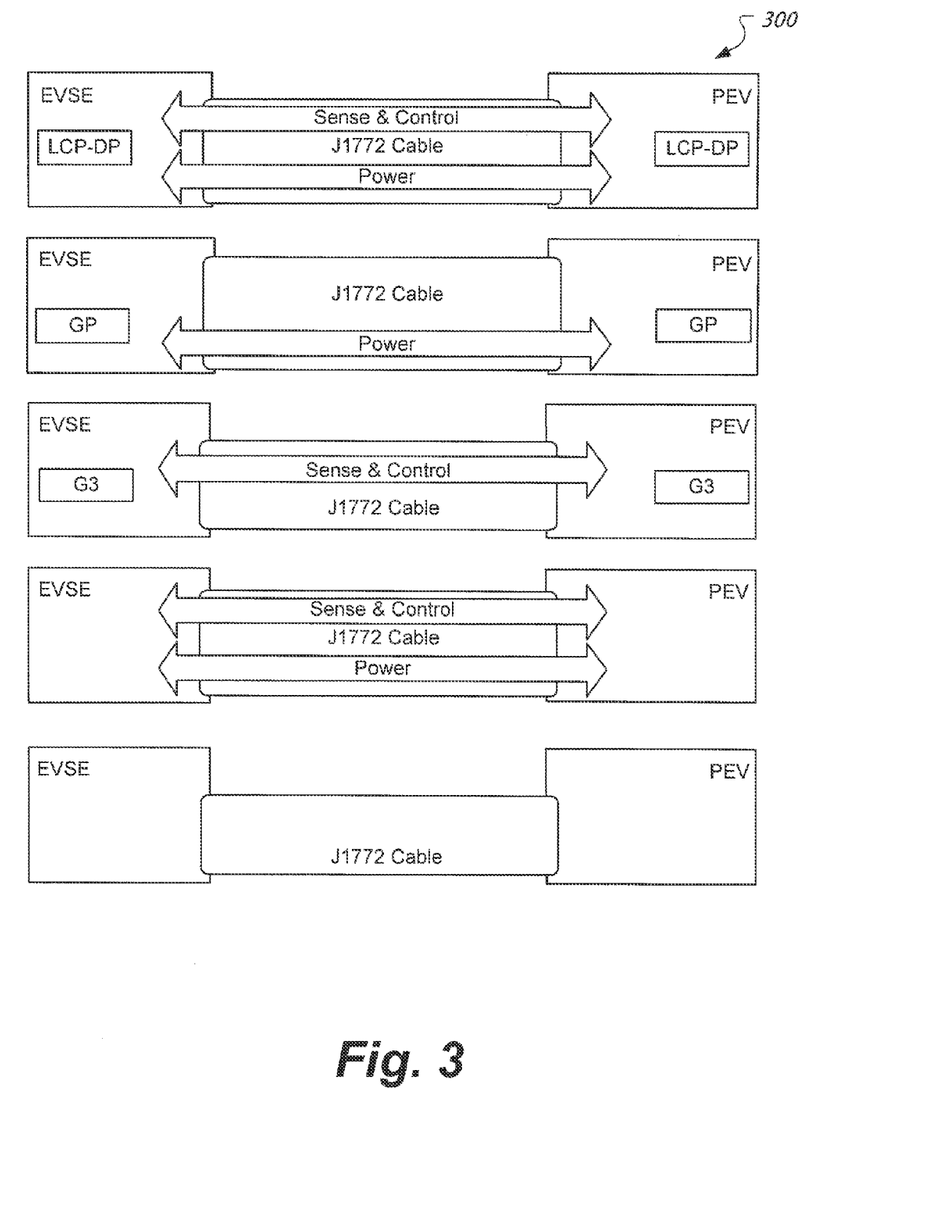
FIG. 3 shows examples of various scenarios for linking Electric Vehicle Supply Equipment (EVSE) to a Pluggable Electric Vehicle (PEV).

FIG. 3 shows examples of various scenarios 300 for linking Electric Vehicle Supply Equipment (EVSE) to a Pluggable Electric Vehicle (PEV). The EVSE and PEV can each include a Low Complexity Profile with dual path (LCP-DP) device that communicates over the sense & control line and the power line of the J1772 cable. The EVSE and PEV can each include a HomePlug Green PHY (GP) device that communicates over the power line of the J1772 cable. Moreover, the EVSE and PEV can each include a G3 PLC device that communicates over the sense & control line of the J1772 cable. One or more of various standards may be adopted by the auto industry standards group (SAE) and may be employed using the systems and techniques of this disclosure. In some implementations, MIMO GP or LCP transceivers can be included in EVs that connect to a MIMO EVSE, which in turn can auto-detect the MIMO or non-MIMO nature of the attached vehicle and then communicate.

Figure 4:
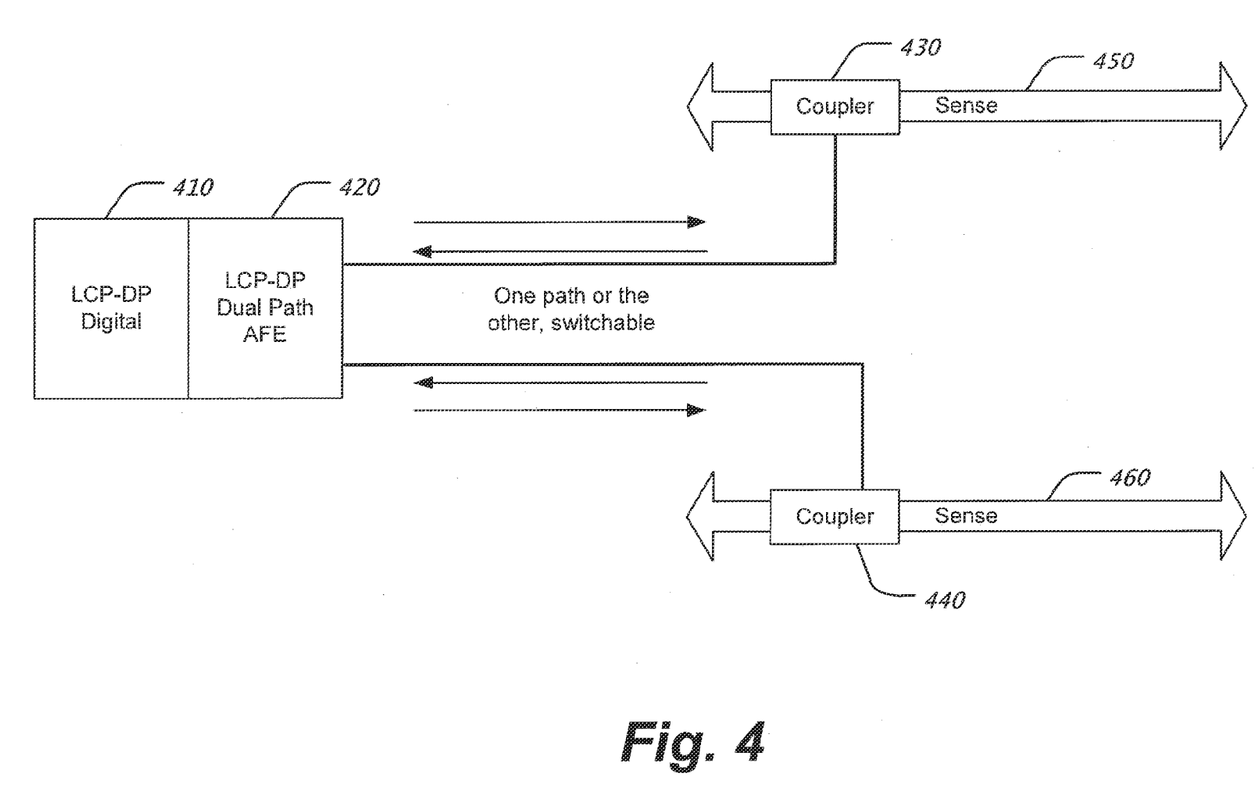
FIG. 4 shows how a Low Complexity Profile with dual path (LCP-DP) device that communicates in accordance with some implementations.

FIG. 4 shows how a Low Complexity Profile with dual path (LCP-DP) device that communicates in accordance with some implementations. LCP-DP digital circuitry 410 has an associated LCP-DP dual path analog front end (AFE) 420. The AFE 420 provides access to two separate and distinct communication paths through couplers 430 and 440. A first path goes over a sense line 450, and the second path goes over a power line 460, where the communication path to use is selectable, such that the device 410 can be switched from one path to the other. This communication architecture can be used in multiple EVSE environments.

For example, the use of DC voltage by EVSE to charge an EV's batteries can present a problem for PLC, especially at voltages of 200 V or higher. Thus, if the cable at hand transports DC over its power line 460, this path for multimegabit exchanges may be lost. But the same device 410 can still be used since the AFE 420 can determine whether or not the power line 460 is available for data exchange.

In addition, in some cases, there may be an association problem caused by an EVSE having more than one J-1772 cable, or multiple EVSE's being closely located together. If two EVs plug in at approximately the same moment and attempt to associate with their EVSE using PLC over the power wires, propagation of the PLC signals from one EVSE may cause transfer of the signal to the other EVSE, causing it to falsely associate its charging session with the wrong EV. By signaling at low power over the sense leads, in conjunction with the sense lead's showing a link has been established, the EV can signal its presence in a more accurate manner.

The use of a multi-path single transceiver at both the EV and EVSE, with one PLC path over the sense/control leads and one over the charge wires (if possible) will enable those high end vehicles to establish sense lead connections for command and control, at least initially, then a multimegabit exchange, if wanted, over the power wire connection. So for example, in a high end car, the chip would start on the control line, pass the battery information, and determine that it can use the power line. And then it would shift up to the power line. Those modest EVs that only support sense lead use can have a lower cost device with only coupling to the sense lead for communication. But even here, the same wideband PLC can be used, but done so in the robust mode, which is designed to have lower throughput and handle a much noisier channel.

Figure 5:
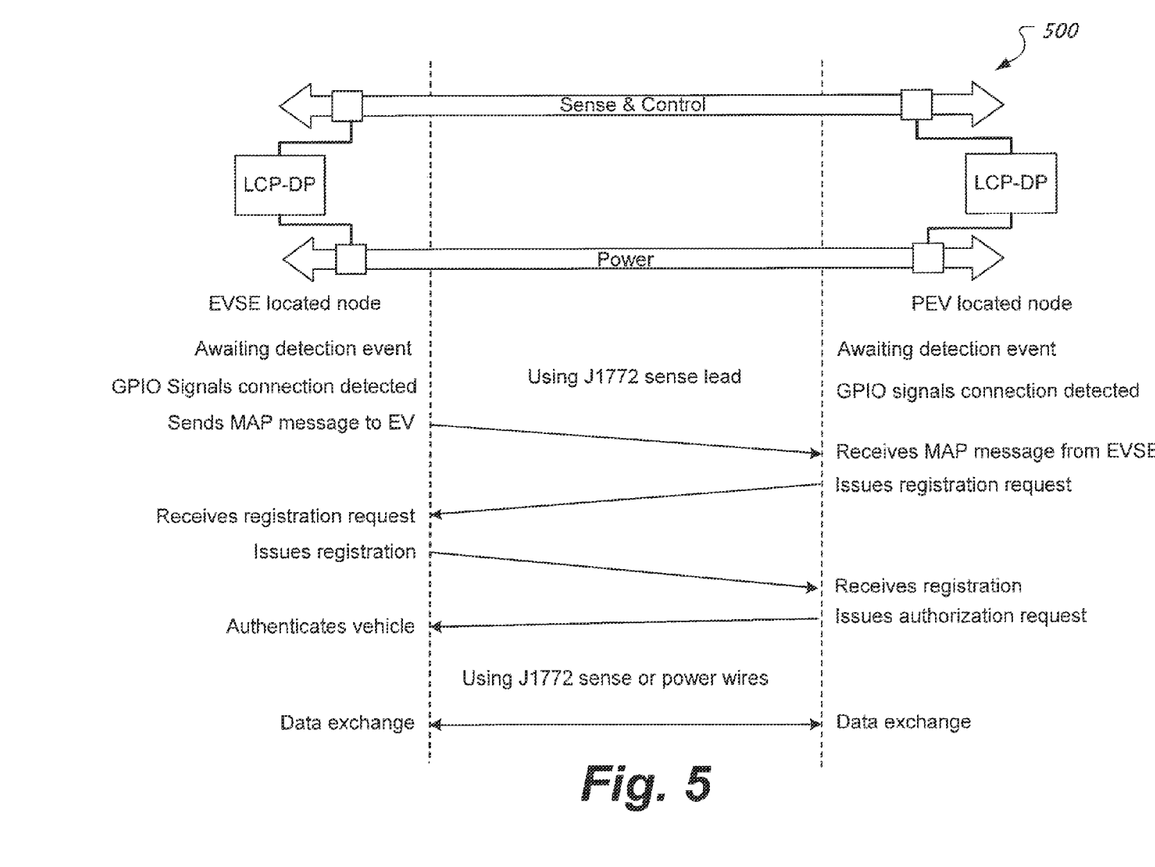
FIG. 5 shows an example of an LCP-DP handshake over two paths.

FIG. 5 shows an example of an LCP-DP handshake 500 over two paths. An EVSE located node awaits a detection event, where GPIO (General Purpose Input/Output) signals that connection is detected, and a PEV located node also awaits a detection event, where GPIO signals that connection is detected, using the sense lead of the J1772 cable. The EVSE located node sends a MAP (Media Access Plan) message to the PEV (the message can be referred to as a Beacon in the case of GP-DP implementations). The PEV receives the MAP message from the EVSE and issues a registration request. The EVSE receives the registration request and issues a registration. The PEV receives the registration and issues an authorization request. Registration means the EV is recognized by the EVSE node as allowed to link to it using PLC and is then allowed to request authentication which means a security controller (which is a processing entity that can be built into the EVSE, or the EVSE can act as a proxy to a remote security controller) checks a database to ensure the EV node requesting service from the EVSE is allowed to establish a communications link, and thus a charging session.

The EVSE authenticates the vehicle, and then data exchanges can begin using the J1772 sense or power wires. The authentication means the PEV is now able to establish a communication link to request a charge. Note that the use of the terms "registration" and "authentication" is generic in nature, and the functions are the same for GP or LCP implementations, even though terms for each may vary. In general, the EVSE finds out what links are available and then determines the best link to use.

Figure 6:
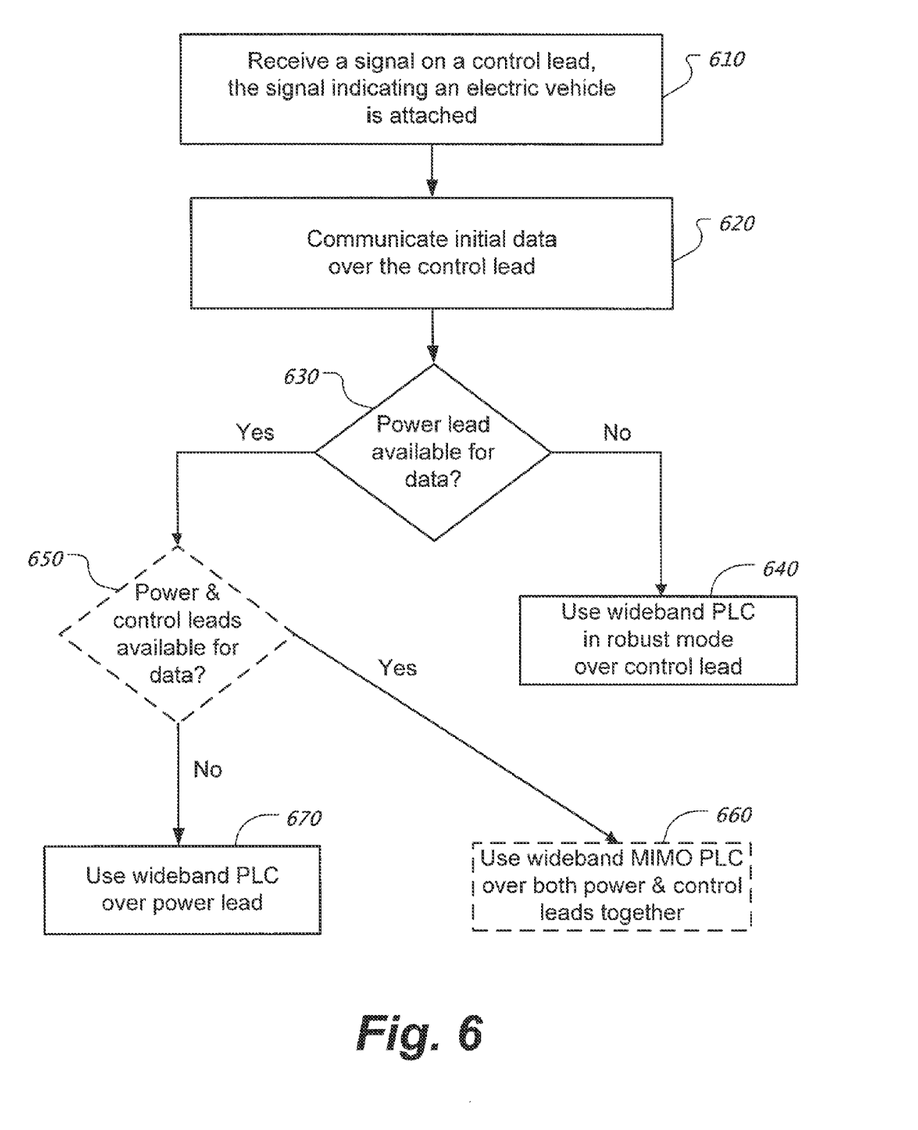
FIG. 6 is a flowchart showing an example of a process for exchanging data using two paths.

FIG. 6 is a flowchart showing an example of a process for exchanging data using two paths. At 610, a signal is received on a control lead of an electric vehicle charging system, where the signal indicates an electric vehicle is attached. At 620, initial data (e.g., the current state of charge of a battery in the electric vehicle) is communicated over the control lead. These operations 610 and 620 can be performed as described above in connection with FIG. 5.

At 630, a determination is made as to whether a power lead of the electric vehicle charging system is available for data exchange. For example, this can involve checking whether the currently attached vehicle has a transceiver that supports data exchange over the power lead. If only the sense/control lead is used by economy vehicles with a non-MIMO node, the EVSE node can send out its MAP message over both of the leads and determine that only the sense/control lead had a response on it, thus setting up logic to turn off the second (power line) path. If a vehicle has only its power line working for a communication link, a similar situation would take place with the EVSE as detailed above. If the EV uses both paths, the EVSE would determine that they were both active, as each path's signal is differentiated from the other path's signal (for example G.hn uses cyclic shifting of signals), ensuring that propagation from one path was not detected as a valid signal on another path.

If the power lead of the electric vehicle charging system is not available for data exchange, wideband PLC is used at 640, in robust mode, to communicate additional data over the control lead. If the power lead of the electric vehicle charging system is available for data exchange, wideband PLC is used at 670 to communicate additional data over the power lead. As will be appreciated, the additional data communicated over the two paths in the different situations can be the same data or different data, depending on the implementation.

In addition, in some implementations, an additional check can be performed. At 650, a determination can be made as to whether both the power lead and the control lead can be used together for data exchange. For example, this can involve checking whether the currently attached vehicle has a transceiver that supports data exchange over both the power lead and the control lead together. If so, wideband PLC can be used at 660 over both the power lead and the control lead to communicate additional data. Otherwise, wideband PLC is used at 670 to communicate additional data over the power lead alone. Moreover, it should be noted that implementations that use operations 650 and 660 are optional since they will generally require additional complexity in the design to handle the differences between the two substantially different transmission environments of the power lead and the control lead.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A system comprising:
   a charging station;
   a dual signaling path to connect the charging station with an electric vehicle, wherein the electric vehicle is chargeable from the charging station using the dual signaling path; and
   processing electronics configured to communicate information to the electric vehicle using the dual signaling path,
   wherein the dual signaling path comprises i) a first path to support charging of the electric vehicle and ii) a second path to support receiving control data from the electric vehicle, and wherein the processing electronics are configured to selectively use the first path or the second path in communicating the information to the electric vehicle; and
   wherein the second path is separate and distinct from the first path.

2. The system of claim 1, wherein the processing electronics are configured to selectively use solely the first path, solely the second path, or both the first and second paths in communicating the information to the electric vehicle.

3. The system of claim 1, wherein the dual signaling path comprises a J-1772 cable.

4. The system of claim 1, wherein the processing electronics comprise a multiple input multiple output (MIMO) wideband powerline communications (PLC) transceiver.

5. The system of claim 4, wherein only one of the first path and second path is used to communicate the information at any one time.

6. The system of claim 4, wherein the MIMO wideband PLC transceiver comprises a G.hn transceiver, and the processing electronics are configured to use
   i) wideband PLC over the first path and ii) robust mode wideband PLC over the second path.

7. An apparatus comprising:
   a first analog front end part connected with a power lead of an electric vehicle charging system;
   a second analog front end part connected with a control lead of the electric vehicle charging system; and
   a powerline communications (PLC) multiple input multiple output (MIMO) transceiver coupled with each of i) the first analog front end part and ii) the second analog front end part,
   wherein the PLC MIMO transceiver is configured to selectively use the power lead or the control lead to communicate information in the electric vehicle charging system, and
   wherein the control lead is separate and distinct from the power lead.

8. The apparatus of claim 7, wherein the PLC MIMO transceiver is configured to transmit and receive using only the power lead, only the control lead, or both the power lead and the control lead.

9. The apparatus of claim 7, further comprising a J-1772 cable, wherein the J-1772 cable comprises the power lead and the control lead.

10. The apparatus of claim 7, wherein the PLC MIMO transceiver comprises a Green PHY (GP) transceiver.

11. The apparatus of claim 10, wherein the PLC MIMO transceiver is configured to use only one of the power lead and the control lead to communicate information at any one time.

12. The apparatus of claim 10, wherein the PLC MIMO transceiver is configured to use i) wideband PLC over the power lead and ii) robust mode wideband PLC over the control lead.

13. A method comprising:
    receiving a signal on a control lead of an electric vehicle charging system, the signal indicating an electric vehicle is attached;
    communicating initial data over the control lead;
    determining whether a power lead of the electric vehicle charging system is available for data exchange;
    using wideband PLC in robust mode over the control lead to communicate additional data when the power lead is not available for data exchange; and
    using wideband PLC over the power lead to communicate additional data when the power lead is available for data exchange;
    wherein the control lead is separate and distinct from the power lead.

14. The method of claim 13, comprising:
    determining whether both the power lead and the control lead can be used together for data exchange; and if so
    using wideband PLC over both the power lead and the control lead to communicate additional data.

15. The method of claim 13, wherein the power lead and the control lead are parts of a J-1772 cable.

16. The method of claim 13, wherein using the wideband PLC comprises using the wideband PLC in accordance with G.hn.

17. The method of claim 16, wherein using the wideband PLC comprises using only one of the power and control leads to communicate data at any one time.

18. A non-transitory computer-readable medium embodying a program operable to cause data processing apparatus to perform operations as recited in claim 13.

19. The non-transitory computer-readable medium of claim 18, wherein the operations comprise:
   determining whether both the power lead and the control lead can be used together for data exchange; and if so using wideband PLC over both the power lead and the control lead to communicate additional data.

20. The non-transitory computer-readable medium of claim 18, wherein using the wideband PLC comprises using the wideband PLC in accordance with G.hn, and using only one of the power and control leads to communicate data at any one time.

* * * * *